United States Patent
Hu et al.

(10) Patent No.: US 10,676,088 B2
(45) Date of Patent: Jun. 9, 2020

(54) POWERTRAIN CONTROL SYSTEM AND METHOD OF OPERATING THE SAME

(71) Applicant: GM GLOBAL TECHNOLOGY OPERATIONS LLC, Detroit, MI (US)

(72) Inventors: Yiran Hu, Shelby Township, MI (US); Junfeng Zhao, Shelby Township, MI (US); Steven E. Muldoon, Pontiac, MI (US); Chen-Fang Chang, Pontiac, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 69 days.

(21) Appl. No.: 16/003,223

(22) Filed: Jun. 8, 2018

(65) Prior Publication Data

US 2019/0375403 A1  Dec. 12, 2019

(51) Int. Cl.
*B60W 30/14* (2006.01)

(52) U.S. Cl.
CPC ..... *B60W 30/143* (2013.01); *B60W 2554/801* (2020.02); *B60W 2554/804* (2020.02)

(58) Field of Classification Search
CPC ......... B60W 30/143; B60W 2550/308; B60W 2550/302
See application file for complete search history.

(56) References Cited

U.S. PATENT DOCUMENTS

| | | | |
|---|---|---|---|
| 6,405,106 B1 | 6/2002 | Sheth | |
| 7,360,615 B2 | 4/2008 | Salman | |
| 7,539,562 B2 | 5/2009 | Maguire | |
| 7,653,469 B2 | 1/2010 | Bai | |
| 8,036,785 B2 | 10/2011 | Maguire | |
| 8,073,605 B2 | 12/2011 | Naik | |
| 8,095,290 B2 | 1/2012 | Smyth | |
| 8,099,220 B2 | 1/2012 | Kim | |
| 8,214,122 B2 | 7/2012 | Krupadanam | |
| 8,239,076 B2 | 8/2012 | McGarry | |
| 8,260,481 B2 | 9/2012 | Naik | |
| 8,290,637 B2 | 10/2012 | Krupadanam | |
| 8,374,740 B2 | 2/2013 | Druenert | |
| 8,392,112 B2 | 3/2013 | Bradburn | |
| 8,504,258 B2 | 8/2013 | Tiberg | |
| 8,606,483 B2 | 12/2013 | Krupadanam | |

(Continued)

FOREIGN PATENT DOCUMENTS

WO   2015051289 A1   4/2015

*Primary Examiner* — Anne Marie Antonucci
(74) *Attorney, Agent, or Firm* — Reising Ethington, P.C.

(57) ABSTRACT

A system and method are provided for operating a powertrain control system. The method includes receiving data measured from a plurality of sensors, the measured data relating to distance dependent speed values, and receiving information from one or more vehicle modules, the vehicle module information relating to distance independent speed values. The method further includes building a speed trajectory profile for a horizon window that includes a plurality of speed change regions represented by at least some distance dependent speed values or at least some distance independent speed values, and creating a synthesized speed profile for the horizon window by processing the speed trajectory profile. The synthesized speed profile optimizes efficiency of the powertrain control system at each of the plurality of speed change regions.

19 Claims, 6 Drawing Sheets

(56) References Cited

U.S. PATENT DOCUMENTS

| | | |
|---|---|---|
| 2006/0064232 A1 | 3/2006 | Ampunan |
| 2014/0277835 A1* | 9/2014 | Filev ................ G01C 21/3469 701/2 |
| 2018/0057001 A1 | 3/2018 | Hu et al. |
| 2018/0057004 A1 | 3/2018 | Muldoon et al. |
| 2018/0058868 A1 | 3/2018 | Kang et al. |
| 2018/0126987 A1* | 5/2018 | Burford ............. B60W 30/143 |
| 2019/0295412 A1* | 9/2019 | Grubwinkler ........ G08G 1/0141 |

* cited by examiner

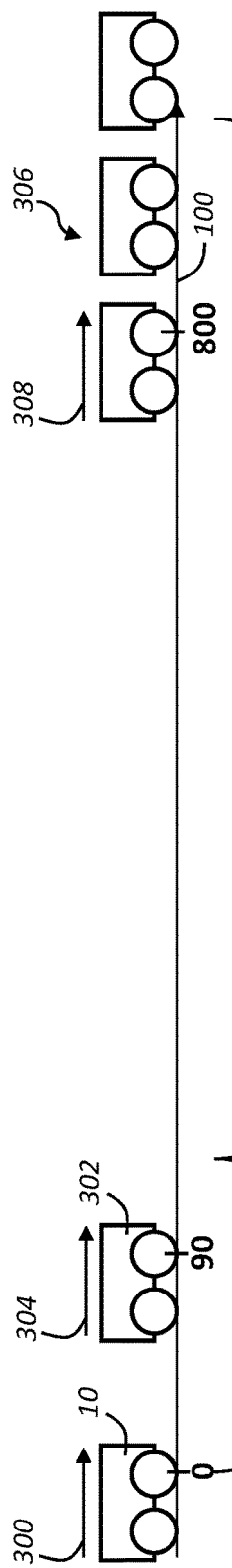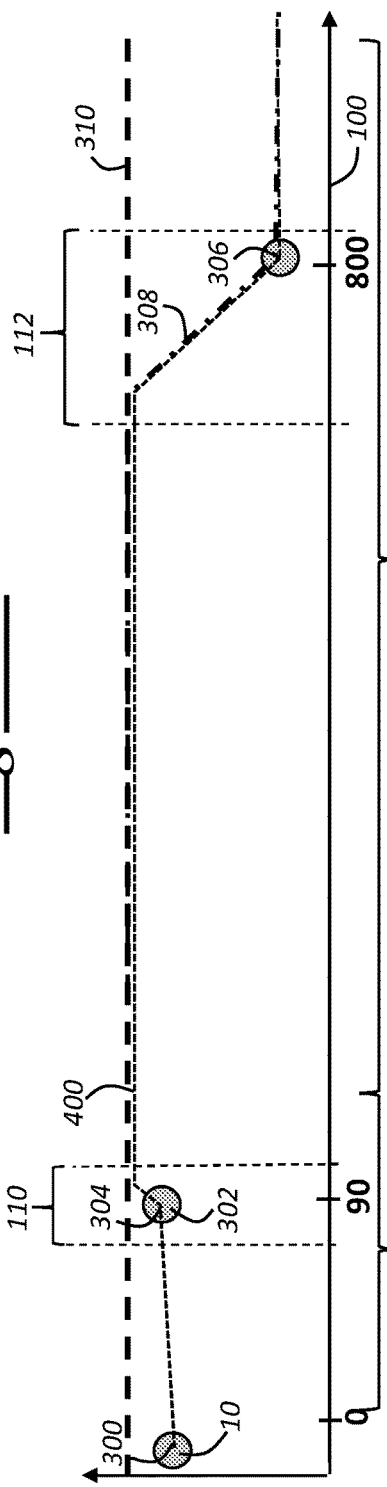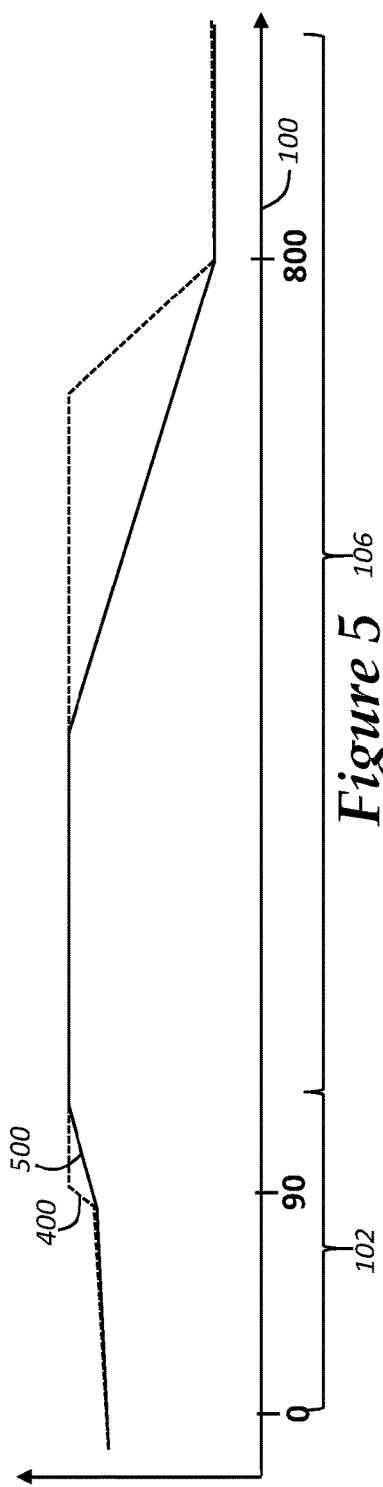

POWERTRAIN CONTROL SYSTEM AND METHOD OF OPERATING THE SAME

GOVERNMENT FUNDING

One or more inventions described herein were made with Government support under ARPA-E Project No. DE-AR0000790 awarded by the Department of Energy. The government may have certain rights in one or more inventions described herein.

INTRODUCTION

The field of technology generally relates to powertrain control systems for vehicles and, more particularly, to powertrain control systems that create synthesized speed profiles to optimize efficiency.

The powertrain control system may use throttle and brake controls to reduce or increase the speed of the host vehicle. The throttle and brake controls may be directly controlled by the driver, via one or more control signals, or a combination of driver control and one or more control signals. Optimizing the efficiency of the powertrain control system during periods in which the speed of the host vehicle is increasing or decreasing can help decrease emissions, increase fuel economy, and control overall traffic speed.

SUMMARY

According to one embodiment, there is provided a system and method for operating a powertrain control system of a host vehicle. The method includes receiving data measured from a plurality of sensors, wherein the measured data relates to distance dependent speed values; receiving information from one or more vehicle modules, wherein the vehicle module information relates to distance independent speed values; building a speed trajectory profile for a horizon window, wherein the speed trajectory profile includes a plurality of speed change regions represented by at least some distance dependent speed values or at least some distance independent speed values; and creating a synthesized speed profile for the horizon window by processing the speed trajectory profile, wherein the synthesized speed profile optimizes efficiency of the powertrain control system at each of the plurality of speed change regions represented by the at least some distance dependent speed values or the at least some distance independent speed values.

According to various embodiments, this method may further include any one of the following features or any technically-feasible combination of these features:

- the horizon window includes a plurality of distance segments;
- the distance independent speed values are available in areas of the speed trajectory profile throughout the entire horizon window in each of the distance segments;
- the distance dependent speed values are available in areas of the speed trajectory profile in one or more distance segments at a portion of the horizon window closest to the host vehicle;
- for one or more distance segments at a portion of the horizon window farthest from the host vehicle, the speed trajectory profile only includes speed change regions corresponding to distance independent speed values without any speed change regions corresponding to distance dependent speed values;
- the portion of the horizon window closest to the host vehicle includes two distance segments, and the portion of the horizon window farthest from the host vehicle includes a third distance segment, wherein a distance of the portion of the horizon window closest to the host vehicle corresponds to a range of one or more sensors of the plurality of sensors;
- the first distance segment is from about 0 meters to 50-100 meters ahead of the host vehicle, the second distance segment is from about 50-100 meters to 150-250 meters ahead of the host vehicle, and the third distance segment is from about 150-250 meters to about 800-1200 meters ahead of the host vehicle;
- the step of building the speed trajectory profile includes favoring distance dependent speed values over distance independent speed values in the first distance segment and the second distance segment;
- the step of building the speed trajectory profile includes favoring distance independent speed values over distance dependent speed values in the third distance segment;
- adjusting the speed trajectory profile as the horizon window shifts;
- the step of adjusting the speed trajectory profile includes corroborating at least some speed change regions that correspond to at least some distance independent speed values with distance dependent speed values as the horizon window shifts;
- each speed change region of the speed trajectory profile includes a minimum of the at least some distance dependent speed values or the at least some distance independent speed values;
- the step of processing the speed trajectory profile includes applying a forward rate limitation filter to limit an acceleration rate at speed change regions where a speed of the host vehicle will be increasing;
- the forward rate limitation filter uses a current or expected road grade and one or more powertrain characteristics of the host vehicle to limit the acceleration rate;
- the step of processing the speed trajectory profile includes applying a backward rate limitation filter to limit a deceleration rate at speed change regions where a speed of the host vehicle will be decreasing;
- the backward rate limitation filter uses a current or expected road grade and one or more coasting characteristics of the host vehicle to limit the deceleration rate; and/or
- the speed change regions of the speed trajectory profile correspond to locations of target vehicles or locations of road feature changes.

According to another embodiment, there is provided a method for operating a powertrain control system of a host vehicle. The method includes receiving speed values from data measured from one or more sensors or information obtained from one or more vehicle modules, wherein the speed values represent speeds of one or more target vehicles or speeds at one or more road feature changes ahead of the host vehicle in a horizon window; building a speed trajectory profile for the horizon window, wherein the speed trajectory profile includes a plurality of speed change regions that correspond to locations of the one or more target vehicles or locations of the one or more road feature changes; applying a forward rate limitation filter to limit an acceleration rate at speed change regions in the speed trajectory profile where a speed of the host vehicle will be increasing; applying a backward rate limitation filter to limit a deceleration rate at speed change regions where a speed of the host vehicle will be decreasing; and using the limited acceleration rate and the limited deceleration rate to control the powertrain control system at each of the speed change regions in the speed trajectory profile.

According to another embodiment, there is provided a powertrain control system for a host vehicle. The powertrain control system includes a plurality of sensors configured to measure data relating to distance dependent speed values; one or more vehicle modules configured to provide information relating to distance independent speed values; a speed trajectory building tool configured to build a speed trajectory profile for a horizon window, wherein the speed trajectory profile includes a plurality of speed change regions represented by at least some distance dependent speed values or at least some distance independent speed values; and a speed trajectory processing tool configured to create a synthesized speed profile for the horizon window by processing the speed trajectory profile to optimize efficiency of the powertrain control system at each of the plurality of speed change regions represented by the at least some distance dependent speed values or the at least some distance independent speed values.

According to another embodiment, the speed trajectory building tool and the speed trajectory processing tool are software platforms configured to be executed using one or more electronic processors associated with a control module of the host vehicle.

BRIEF DESCRIPTION OF THE DRAWINGS

Preferred exemplary embodiments will hereinafter be described in conjunction with the appended drawings, wherein like designations denote like elements, and wherein:

FIG. 3 schematically illustrates the host vehicle of FIG. 1 and a horizon window in accordance with one embodiment;

FIG. 4 is a graph of distance versus speed showing a speed trajectory profile for the horizon window of FIG. 3;

FIG. 5 is a graph of distance versus speed showing the speed trajectory profile of FIG. 4 with a synthesized speed profile for the horizon window of FIG. 3;

DETAILED DESCRIPTION

The system and method described herein relate to a powertrain control system configured to implement a method that creates synthesized speed profiles designed to optimize powertrain efficiency. Optimizing powertrain efficiency includes modifying emissions, fuel consumption, and/or traffic velocity. By looking at various speed values as a function of distance within a horizon window ahead of the host vehicle, the system and method described herein can make distance-related and speed-related adjustments to various aspects of the powertrain control system, such as encouraging coasting of the host vehicle when a certain distance is near or achieved in the horizon window.

A speed trajectory profile, which consists of expected upcoming speeds of the host vehicle, is built by strategically using inputs from various vehicle sources. The speed trajectory profile is then processed to optimize powertrain efficiency and create the synthesized speed profile. The synthesized speed profile may be used in various ways within the powertrain control system, such as to provide a speed recommendation to the driver of the host vehicle, or to provide a supplemental gain, torque, or acceleration request that adjusts the vehicle speed up or down to achieve better powertrain efficiency, such as when implemented in an autonomous or semi-autonomous vehicle, to cite a few examples.

System—

Figure 1:
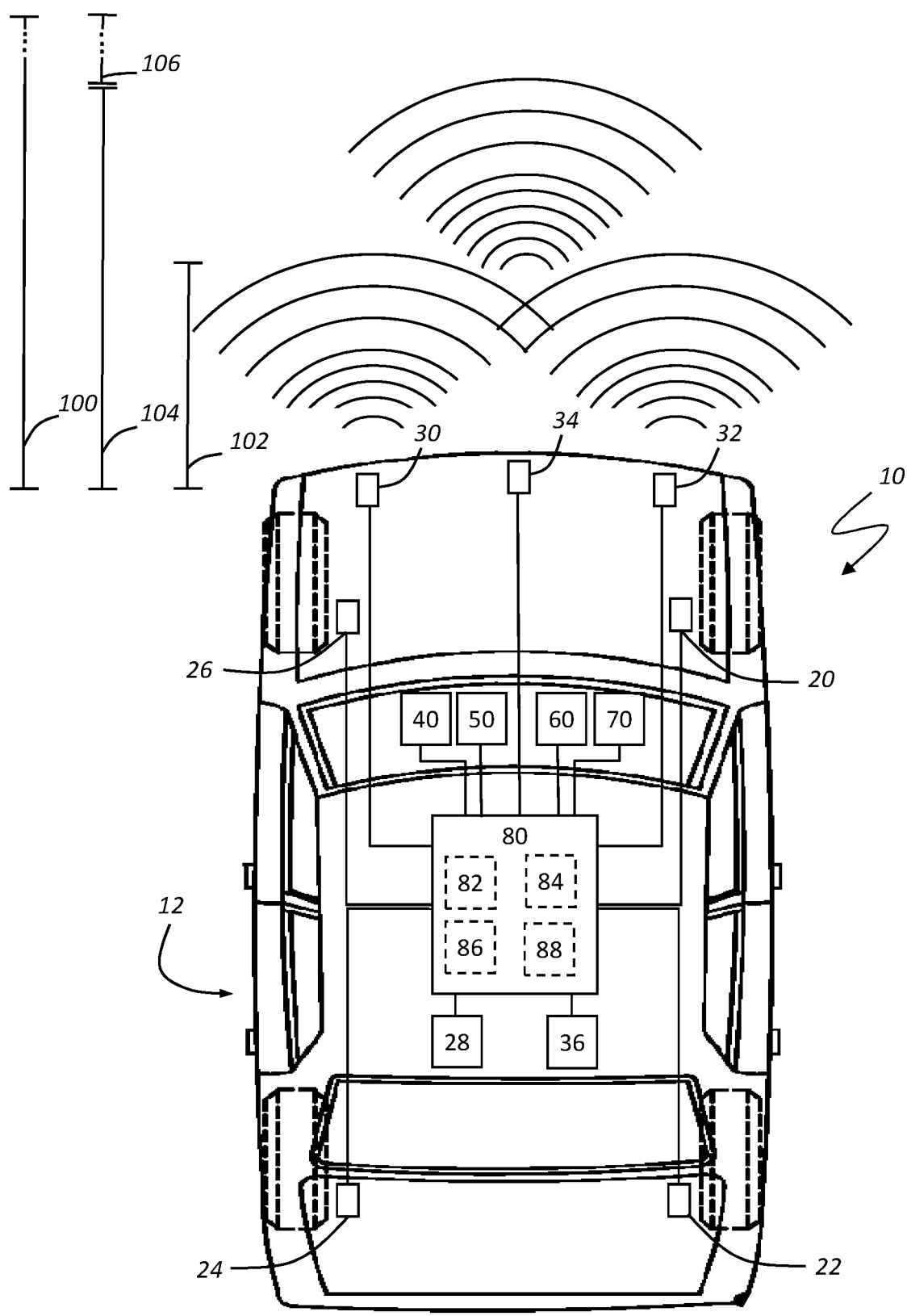
FIG. 1 is a schematic representation of a host vehicle and powertrain control system that is capable of utilizing various embodiments of the method disclosed herein.

With reference to FIG. 1, there is shown a schematic representation of an example host vehicle 10 equipped with a powertrain control system 12 capable of creating and processing the various speed profiles described herein. It should be appreciated that the powertrain control system and method may be used with any type of vehicle, including traditional passenger vehicles, sports utility vehicles (SUVs), cross-over vehicles, trucks, vans, buses, recreational vehicles (RVs), motorcycles, etc. These are merely some of the possible applications, as the powertrain control system and method described herein are not limited to the exemplary embodiment shown in FIG. 1 and could be implemented with any number of different vehicles. According to one embodiment, powertrain control system 12 includes host vehicle sensors 20-28, object detection sensors 30-32, a V2X sensor unit 34, an ambient sensor 36, GPS module 40, a human-machine interface (HMI) 50, and control modules 60, 70, 80.

Any number of different sensors, components, devices, modules, systems, etc. may provide the powertrain control system 12 with information, data and/or other input. These include, for example, the components shown in FIG. 1, as well as others that are known in the art but are not shown here. It should be appreciated that the host vehicle sensors, V2X sensor, object detection sensors, GPS module, control modules, HMIs, as well as any other component that is a part of and/or is used by the powertrain control system 12 may be embodied in hardware, software, firmware or some combination thereof. These components may directly sense or measure the conditions for which they are provided, or they may indirectly evaluate such conditions based on information provided by other sensors, components, devices, modules, systems, etc. Furthermore, these components may be directly coupled to the control module 80, indirectly coupled via other electronic devices, a vehicle communications bus, network, etc., or coupled according to some other arrangement known in the art. These components may be integrated within another vehicle component, device, module, system, etc. (e.g., sensors that are already a part of an engine control module (ECM), traction control system (TCS), electronic stability control (ESC) system, antilock brake system (ABS), etc.), they may be stand-alone components (as schematically shown in FIG. 1), or they may be provided according to some other arrangement. In some instances, multiple sensors might be employed to sense a single parameter (e.g., for providing redundancy). It should be appreciated that the foregoing scenarios represent only some of the possibilities, as any type of suitable arrangement or architecture may be used to carry out the method described herein.

The host vehicle sensors 20-28 may include any type of sensing or other component that provides the present system and method with data or information regarding the performance, state and/or condition of the host vehicle 10. According to the non-limiting example shown in FIG. 1, the host vehicle sensors include host vehicle speed sensors 20-26 and a dynamic sensor unit 28.

The host vehicle speed sensors 20-26 provide the system 12 with speed readings that are indicative of the rotational speed of the wheels, and hence the overall speed or velocity of the vehicle. In one embodiment, individual wheel speed sensors 20-26 are coupled to each of the vehicle's four wheels and separately provide speed readings indicating the rotational velocity of the corresponding wheel (e.g., by counting pulses on one or more rotating wheel(s)). Skilled artisans will appreciate that these sensors may operate according to optical, electromagnetic or other technologies, and that speed sensors 20-26 are not limited to any particular speed sensor type. In another embodiment, the speed sensors could be coupled to certain parts of the vehicle, such as an output shaft of the transmission or behind the speedometer, and produce speed readings from these measurements. It is also possible to derive or calculate speed readings from acceleration readings (skilled artisans appreciate the relationship between velocity and acceleration readings). In another embodiment, speed sensors 20-26 determine vehicle speed relative to the ground by directing radar, laser and/or other signals towards the ground and analyzing the reflected signals, or by employing feedback from a navigation unit that has Global Positioning System (GPS) capabilities (e.g., GPS module 40). It is possible for the speed readings to be provided to the system 12 by some other module, subsystem, system, etc., like a powertrain or engine control module or a brake control module. Any other known speed sensing techniques may be used instead.

Dynamic sensor unit 28 provides the system with dynamic readings that pertain to the various dynamic conditions occurring within the vehicle, such as acceleration and yaw rate. Unit 28 may include any combination of sensors or sensing elements that detect or measure vehicle dynamics, it and may be packaged separately or in a single unit. According to one exemplary embodiment, dynamic sensor unit 28 is an integrated inertial measurement unit (IMU) that includes a yaw rate sensor, a lateral acceleration sensor, and a longitudinal acceleration sensor. Some examples of suitable acceleration sensor types include micro-electromechanical system (MEMS) type sensors and tuning fork-type sensors, although any type of acceleration sensor may be used. Depending on the particular needs of the system, the acceleration sensors may be single- or multi-axis sensors, may detect acceleration and/or deceleration, may detect the magnitude and/or the direction of the acceleration as a vector quantity, may sense or measure acceleration directly, may calculate or deduce acceleration from other readings like vehicle speed readings, and/or may provide the g-force acceleration, to cite a few possibilities. Although dynamic sensor unit 28 is shown as a separate unit, it is possible for this unit or elements thereof to be integrated into some other unit, device, module, system, etc.

Of course, other host vehicle sensors that provide information as to the state of the host vehicle 10 could be used in addition to or in lieu of those described above. Some potential examples include steering angle sensors, accelerator and brake pedal sensors, stability sensors, and gear selection sensors, to cite just a few.

Object detection sensors 30, 32 provide the system 12 with object data that pertain to nearby vehicles, pedestrians, or other objects surrounding the host vehicle 10. Since the object detection sensors 30, 32 provide the system 12 with object data within a certain measurable distance segment 102, the object detection sensors 30, 32 may provide data relating to distance dependent speed values of nearby vehicles or other objects. The object readings can be representative of the presence, position, velocity, and/or acceleration of nearby vehicles, as well as of nearby pedestrians and other objects. This data may be absolute in nature (e.g., an object velocity or acceleration relative to ground or some other frame of reference) or the data may be relative in nature (e.g., an object velocity or acceleration relative to the host vehicle). The data from object sensors 30, 32 may also be used instead of, or to otherwise supplement or corroborate, the information provided by the GPS module 40 and/or the V2X sensor unit 34. Each of the object detection sensors may be a single sensor or a combination of sensors, and may include one or more RADAR devices, laser devices, LIDAR devices, ultrasound devices, vision devices (e.g., camera, etc.), other known devices or combinations thereof. According one embodiment, object detection sensors 30, 32 are forward-looking sensors that are mounted towards the front of the vehicle and are capable of monitoring areas that are generally ahead of and off to the side of the host vehicle 10. Other object detection sensors are certainly possible, such as rearward- or sideways-looking sensors that are mounted towards the rear or side of the vehicle and are able to monitor areas generally behind the vehicle or off to its side. Of course, the host vehicle 10 may include a combination of object detection sensors that differs from the example combination shown in FIG. 1, as that embodiment is only meant to illustrate one possibility.

The V2X sensor unit 34 provides data relating to other vehicles, infrastructure, etc. near the host vehicle 10. The V2X sensor unit 34 may receive wireless messages over an inter-vehicle communication network, such as a dedicated short range communication (DSRC) or cellular protocol. While the V2X sensor unit 34 may not be a traditional sensor that directly detects or measures a physical property, the V2X sensor unit 34 is classified as a vehicle sensor in embodiments as it is capable of receiving distance dependent speed values (i.e., information about nearby vehicles or objects within a limited distance or range from the host vehicle 10). The wireless messages may be transmitted as a standard periodic beacon message that includes data relating to vehicle positions, vehicle kinematics/dynamic parameters such as speed values or data relating to speed values, or traffic or road events sensed by respective target or remote vehicles. The V2X sensor unit 34 may be able to provide information about remote vehicles that are not readily seen or detectable via object detection sensors 30, 32. Accordingly, the measured data from the V2X sensor unit 34 may come from a wider array of sources ahead of the host vehicle 10, in the distance segment 104 which is schematically illustrated in FIG. 1. Like the object detection sensors 30, 32, the V2X sensor unit 34 may provide data relating to distance dependent speed values of nearby vehicles or other objects. For example, the V2X sensor unit 34 may be V2V (vehicle-to-vehicle) capable, V2I (vehicle-to-infrastructure) capable, and/or V2P (vehicle-to-pedestrian) capable. Although the V2X sensor unit 30 is shown as a separate unit, it is possible for this unit or elements thereof to be integrated into some other unit, device, module, system, etc., such as a telematics unit or an active safety module, to cite two examples.

Ambient sensor 36 provides the system 12 with ambient readings regarding outside weather or other environmental conditions that could affect driving. For example, ambient sensor 36 may report an outside temperature, an outside humidity, current or recent data on precipitation, road conditions, or any other type of environmental readings. By knowing the outside temperature and the amount of recent precipitation, for instance, the present system and method may adjust the synthesized speed profile in order to take into account slippery road surfaces and the like. The ambient sensor 36 may determine environmental conditions by directly sensing and measuring such conditions, indirectly determining environmental readings by gathering them from other modules or systems in the vehicle, or by receiving wireless transmissions that include weather reports, forecasts, etc. from a weather-related service or website.

GPS module 40 provides the system 12 with navigation information that represents the location or position of the host vehicle 10 and/or roads in the vicinity of the host vehicle. Depending on the particular embodiment, GPS module 40 may be a stand-alone component or it may be integrated within some component or system within the vehicle. The GPS module 40 may include any combination of other components, devices, units, modules, etc., like a Global Navigation Satellite System (GLONASS) unit or a memory device with stored map data, and may use the current position of the host vehicle and road- or map-data to evaluate upcoming distance segments. In some embodiments, the GPS module 40 may also receive input from a back office facility or the like relating to traffic conditions, road features, etc. in a distance segment 106 ahead of the host vehicle. The GPS module 40 may provide information regarding road conditions, such as road geometry (e.g., curved, straight, forked, number and width of lanes, estimated road grade, etc.), nearby road features (e.g., intersections, traffic circles, entrance and exit ramps, etc.), as well as traffic conditions (e.g., lane closures, road construction, accidents, heavy traffic flows, speed limits and actual traffic speeds, etc.). GPS module 40 may have some type of user interface so that information can be verbally, visually or otherwise exchanged between the module and the driver. The GPS module 40 can store pre-loaded map data and the like, or it can wirelessly receive such information through a telematics unit or some other communications device, to cite two possibilities. Any suitable GPS module 40 may be used, as the present system and method are not limited to any particular type.

The aforementioned host vehicle sensors 20-28, object detection sensors 30-32, V2X sensor unit 34, ambient sensor 36, and GPS module 40, as well as other known sensors not listed herein, may provide input to the powertrain control system 12 in a manner that helps enable the method described below to generate and/or evaluate a synthesized speed profile to optimize powertrain efficiency. The description of the powertrain control system 12 now turns to various output devices, such as HMI 50, an engine control module 60, a braking control module 70, as well as control module 80 which can be used to carry out the present method.

HMI 50 may include any type of output device or other component that can be used to inform, alert and/or otherwise show the driver a synthesized speed profile or information from the synthesized speed profile. In some embodiments, such as with autonomous or semi-autonomous vehicles, there may be no need to present the synthesized speed profile information to the driver via an HMI, as the synthesized speed profile may be used directly by the engine or powertrain control module 60, the braking control module 70, or the control module 80 to generate a torque command or the like. Use of the HMI 50 may be more advantageous in non-autonomous scenarios. The HMI 50 may include a graphic display unit, a driver information center, an infotainment unit, vehicle instrumentation and controls, and/or a heads-up-display unit, to cite a few of the possibilities.

Control modules 60, 70, 80 may include any control modules, control units, controllers, etc. within the host vehicle 10 that relate to various features of the powertrain of the host vehicle. In some embodiments, the control modules 60, 70, 80 can perform autonomous, semi-autonomous and/or other automated driving actions in response to control signals from system 12. "Automated driving action," as used herein, broadly means any driving-related action or function that is automatically taken by the host vehicle without driver request and includes actions falling within levels 1-4 of the National Highway Traffic Safety Administration (NHTSA) classification system. To illustrate, the engine or powertrain control module 60 and/or the control module 80 may be used to automatically control the speed of the vehicle, while the brake control module 70 can be used to control host vehicle 10 braking. In some embodiments, brake control module 70 may help control a regenerative braking system in which braking energy is stored and reused. In some embodiments, there is not a separate engine control module 60 or braking control module 70, as the propulsion related tasks may be all accomplished via the control module 80. In other embodiments the control module 80 may be a powertrain or engine control module itself, without a separate powertrain or engine control module 60. Further, other control modules may certainly be used, as the preceding examples are just meant to illustrate some of the possibilities. Skilled artisans will appreciate that it is possible for one or more of the control modules 60, 70, 80 to constitute or include some of the vehicle sensors described above. For instance, the control module 80 could operate as both a speed sensor (input device that provides the system with speed readings regarding engine and/or vehicle speed), as well as a control module (output device that controls engine and/or vehicle speed in response to control signals during an automated driving event). The same is true regarding the engine control module 60 and the braking control module 70, in terms of acting as both input and output devices to vehicle control system 12.

Control module 80 is coupled to the host vehicle sensors 20-28, the object detection sensors 30-32, the V2X sensor 34, the GPS module 40, the HMI 50, and the control modules 60, 70 so that it can gather sensor readings from the sensors, information from the modules, and provide command signals to the HMI and/or control modules according to the present method. Control module 80 may include any variety of electronic processing devices, memory devices, input/output (I/O) devices, and/or other known components, and may perform various control and/or communication related functions. In an example embodiment, control module 80 includes an electronic memory device 82 that stores sensor readings (e.g., sensor readings from sensors 20-36), look up tables or other data structures, algorithms (e.g., the algorithm embodied in the exemplary method described below), etc. The memory device 82 may maintain a buffer consisting of data collected over a predetermined period of time (e.g., the amount of time for the vehicle to travel through a horizon window 100 ahead of the vehicle). The memory device 82, or just a portion thereof, can be implemented or maintained in the form of an electronic data structure, as is understood in the art. Control module 80 also includes an electronic processing device 84 (e.g., a microprocessor, a microcontroller, an application specific integrated circuit (ASIC), etc.) that executes instructions for software, firmware, programs, algorithms, scripts, etc. that are stored in memory device 82 and may partially govern the processes and methods described herein. In an example embodiment, the control module 80 includes a speed trajectory building tool 86 configured to build a speed trajectory profile for a horizon window 100 ahead of the host vehicle 10, and a speed trajectory processing tool 88 configured to create a synthesized speed profile for the horizon window 100 by processing the speed trajectory profile to optimize efficiency of the powertrain control system 12. Either or both of the speed trajectory building tool 86 and the speed trajectory processing tool 88 may be platforms at least partially stored on the electronic memory device 82 and at least partially executable by the electronic processing device 84.

Depending on the particular embodiment, the control module 80 may be a stand-alone vehicle electronic module (e.g., an engine controller, a sensor control unit, etc.), may be incorporated or included within another vehicle electronic module (e.g., an automated driving control module, an active safety control module, etc.), or may be part of a larger network or system (e.g., an automated driving system, a fuel efficiency system, etc.), to name a few possibilities. Accordingly, the control module 80 is not limited to any one particular embodiment or arrangement and may be used by the present method to control one or more aspects of vehicle operation.

The control module 80 may be used to control the vehicle powertrain. In one embodiment, the vehicle powertrain includes an internal combustion engine that develops torque to drive the powertrain in response to a request from the control module 80. The amount of torque to the engine is established by one or more actuators that control at least one of fuel, ignition, residual exhaust gas or exhaust recirculation (EGR), number of cylinders firing, and air flow. It should be appreciated that the engine may be a gasoline-powered, diesel-powered, or any other suitable fuel-powered type of engine, with the fuel amount, injection timing, residual exhaust gas or EGR, and/or turbo boost being adjusted to control the amount of torque. For example, EGR and boost may control the air flow indirectly by displacing air with exhaust gas in a cylinder charge. The powertrain may also include an electric motor that provides torque in accordance with a torque command. The torque of electric motor can be combined with the torque of the engine to provide power for the powertrain, such as in a hybrid vehicle. In a different embodiment, the present method is used in the context of an electric vehicle that has no engine at all. Thus, application of the method and system described herein is potentially available for traditional vehicles with an engine, hybrid vehicles, as well as electric vehicles. In other embodiments, the control module 80 may send a signal to another module, such as the engine control module 60, to accomplish one or more of the tasks listed above.

Any of the aforementioned control modules may include a combination of electronic processing devices, memory devices, input/output (I/O) devices, and other known components, and they may be electronically connected to other vehicle devices and modules via a suitable vehicle communications network, and may interact with them when required. It should be appreciated that the basic architecture, structure and overall arrangement of such control modules are well known in the art and are, therefore, not described here in further detail.

The powertrain control system 12 may also include a calibration file, which is a setup file that defines the commands given to the actuating vehicle control modules such as the engine control module 60, the braking control module 70, or the control module 80. The commands govern the powertrain control system 12 and may include a desired acceleration or deceleration request derived directly or indirectly from the synthesized speed profile. Depending on the input parameters, the desired acceleration or deceleration request may be configured to accelerate or decelerate the host vehicle 10. The desired acceleration or deceleration request may also be configured to maintain the current speed of the host vehicle 10. One of ordinary skill in the art further appreciates that the desired acceleration or deceleration request may take many forms and may be referred to in different ways. For example, the desired acceleration or deceleration request may be in the form a torque request (positive or negative) or in the form of a speed request (positive or negative).

Method—

Figure 2:
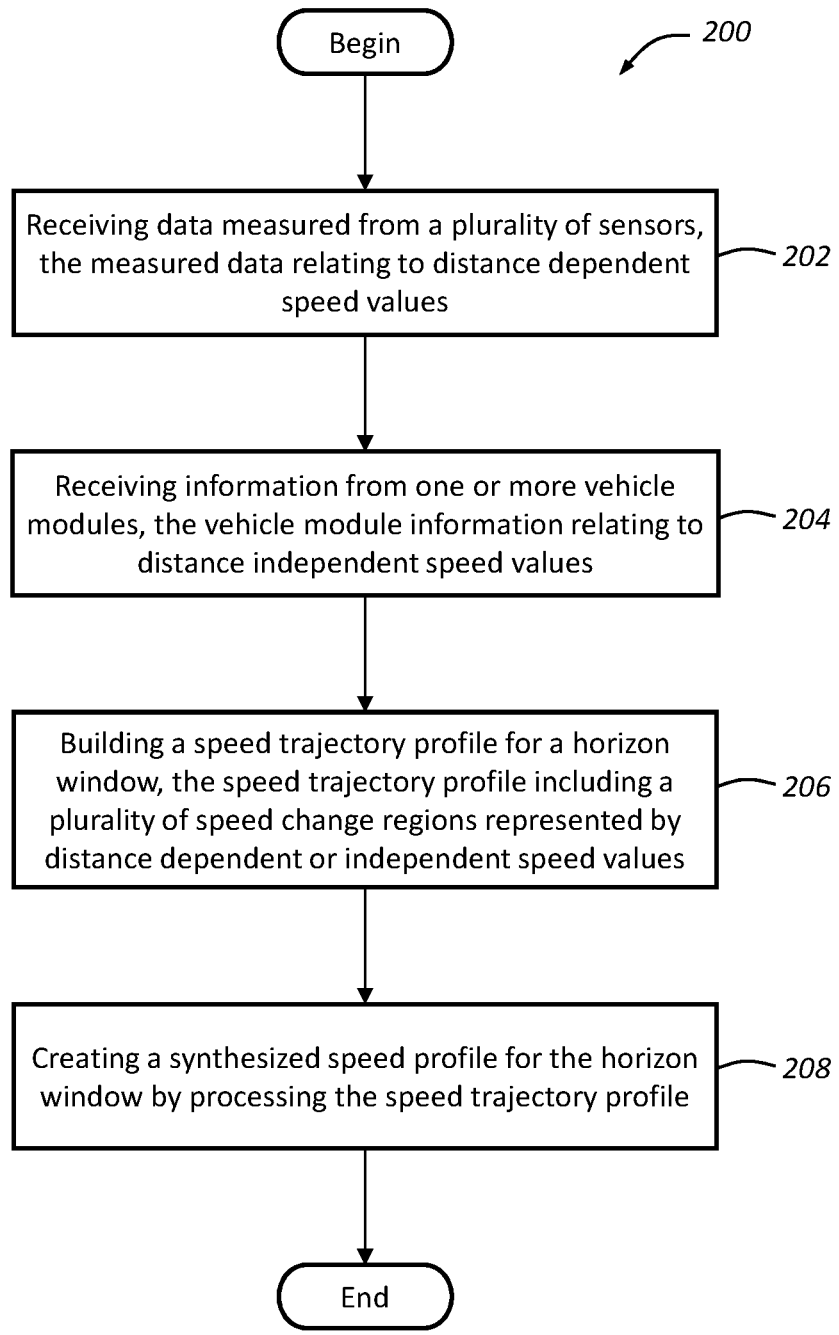
FIG. 2 is a flowchart illustrating an example embodiment of the method disclosed herein.

FIG. 2 illustrates a method 200 for operating a powertrain control system using the system described above with respect to FIG. 1. It should be understood that the steps of the method 200 are not necessarily presented in any particular order and that performance of some or all the steps in an alternative order is possible and is contemplated. Further, it is likely that the method 200 could be implemented in other systems that are different from the system illustrated in FIG. 1, and that the description of the method 200 within the context of the system 12 is only an example.

The method 200 begins at step 202, by receiving data measured from a plurality of sensors, such as the host vehicle sensors 20-28, the object detection sensors 30-32, and/or the V2X sensor 34. The plurality of sensors gather data relating to any target vehicles that are in the host vehicle's 10 field of detection. The data received from the object detection sensors 30-32 and/or the V2X sensor 34 may relate to speed values of upcoming events, including but not limited to, upcoming speeds or relative speeds of target vehicles, upcoming road feature changes, etc. Other vehicle data (e.g., host vehicle speed and acceleration, etc.) may be gathered as well. The sensors may provide speed values directly, or they may provide data relating to speed values, and then the actual processing or calculation of speed values is done by another vehicle system or module, such as the control module 80.

Typically, since the sensors 20-38 have a somewhat limited reach or range, the speed values obtained via data from these sensors may be considered distance dependent speed values. For example, the object detection sensors 30-32 may provide data relating to target vehicles or road feature changes within a first distance segment 102. In one embodiment, this first distance segment is from about 0 meters to 50-100 meters ahead of the host vehicle 10. A V2X sensor unit 34 may provide data relating to target vehicles within the first distance segment 102 and a second distance segment 104, the second distance segment being from about 50-100 meters to about 150-250 meters ahead of the host vehicle 10 in one embodiment. Accordingly, distance dependent speed values may be obtainable from either the first distance segment 102 or the second distance segment 104. In some embodiments, the distance dependent speed values obtained from the first distance segment 102 using data from the object detection sensors 30-32 can be very precise, and they may be favored over, or weighted more than, speed values obtained from other sensors or information sources (e.g., crowd sourced traffic data or map data). Similarly, distance dependent speed values obtained from the second distance segment 104 using data from the V2X sensor unit 34 may be favored over, or weighted more than, speed values obtained from other information sources (e.g., crowd sourced traffic data or map data).

Step 204 involves receiving information from one or more vehicle modules. In one embodiment, step 204 involves receiving information from a vehicle module such as the GPS module 40. The information may relate to distance independent speed values. As opposed to the distance dependent speed values, distance independent speed values may be accessible along the entire route of the host vehicle 10, not within a limited sensing window or range. For example, there may be some distance independent speed values that are generally accurate over the route of the host vehicle 10, such as distance independent speed values derived from map information, static objects, or infrastructure. The GPS module 40 may also provide information relating to the road grade or road type for use with the method 200. Vehicle module information may be derived from other sources besides the GPS module 40, such as a telematics unit that facilitates the provision of information such as crowd-sourced traffic information or traffic signal information via LTE wireless (4G/5G) or via some other communications protocol. A telematics unit may also be a vehicle module that provides distance independent speed values from a back office facility or call center in some embodiments.

In some implementations, to encourage more accurate prediction and ease processing burdens, the distance independent speed values, such as those derived from GPS module 40 or map data, may only be obtained or processed for a limited horizon window 100 ahead of the host vehicle 10, as schematically illustrated in FIGS. 1 and 3-6. In one embodiment, the horizon window 100 may be about 800-1200 meters ahead of the vehicle. Accordingly, speed values may be obtainable within a third distance segment 106 that is beyond the 150-250 meters in the first and second distance segments 102, 104. Thus, the third distance segment 106 may be from about 150-250 meters to about 800-1200 meters ahead of the host vehicle 10. Other shorter or longer distances for the respective distance segments are certainly possible, and the distances will likely vary depending vehicle sensor and module capabilities. In one embodiment, the first, second, and third distance segments 102, 104, 106 may together represent the horizon window 100 ahead of the host vehicle 10. In another embodiment, the horizon window is not defined by the sensing capabilities, and may be defined by other factors or parameters, such as the length of the route. An advantage of the method 200 involves the optimization of the efficiency of the powertrain control system 12, and by looking at various speed values as a function of distance within the horizon window 100, the method 200 can make distance-related and speed-related adjustments to various aspects of system 12, such as encouraging coasting of host vehicle 10 when a certain distance is near or achieved in the horizon window 100. In some embodiments, however, the horizon window 100 is not segmented, such that the ranges for obtaining the distance dependent and distance independent speed values are not necessarily tied or limited to specific or hardline ranges.

Step 206 of the method 200 involves building a speed trajectory profile. In one embodiment, this step is accomplished with a speed trajectory building tool 86 associated with, or executed via, the control module 80. FIGS. 3 and 4 illustrate a simple example of building a speed trajectory profile 400 for the horizon window 100. The horizon window 100 or distance is generally represented by the x-axis in each of FIGS. 3-5. The y-axis is speed such that FIGS. 4 and 5 are graphs of distance vs. speed. Accordingly, in this embodiment, processing data or information from various vehicle sources creates speed values as a function of respective distances. The method may be particularly useful when the host vehicle 10 is on a known map route, but in embodiments in which the map route of the host vehicle 10 is unknown, it may be desirable to limit the horizon window 100 distance to ease processing burdens. Step 206 may be iterative, in that the speed trajectory profile 400 may be updated numerous times with new data and information, such that points or regions on the profile 400 are corroborated with sometimes more accurate data (e.g., map data used to develop points on the speed trajectory profile 400 may be corroborated with sensor data once the host vehicle 10 is in range, etc.).

FIG. 3 illustrates the host vehicle 10, which is traveling at 60 miles per hour (MPH). The speed value 300 of the host vehicle 10 may be derived from data from the host vehicle speed sensors 20-28 in one embodiment. In the example, a target vehicle 302 is traveling at a speed of 65 MPH at a distance about 90 meters ahead of the host vehicle 10, which is a distance dependent speed value 304, as it can be obtained from sensor data from one of the object detection sensors 30-32 or a V2X sensor 34, to cite two examples. Continuing with the example, a cluster of traffic 306 is about 800 meters ahead of the host vehicle 10. Information from the GPS module 40 or another module may indicate that the cluster of traffic 306 is traveling at a speed of about 20 MPH, a distance independent speed value 308. This distance independent speed value 308 is a cloud-based average traffic speed, as represented by the dashed/dotted line 312 in FIG. 4. Another distance independent speed value in this example is the speed limit of the road, which may be about 70 MPH, as represented by the large dashed line 310 in FIG. 4. These distance independent speed values can be obtained using information from the GPS module 40 or another vehicle module, such as a telematics unit. As addressed above, these distance independent speed values 308, 310 are typically speed values obtained or derived from sources beyond the reach of host vehicle sensors 20-34.

In one embodiment of step 206, building the speed trajectory profile 400 involves evaluating which speed values will make up the speed trajectory profile. Continuing with the example above, a number distance dependent speed values, such as the distance dependent speed value 304 of the target vehicle 302, and a number of distance independent speed values, such as the cloud based traffic speed 308 and the speed limit of the road 310, may be obtained, and there may be more than one speed value available for a given distance in the horizon window 100. In this example, at a location corresponding to the position of the target vehicle 302, there is a distance dependent speed value 304 (65 MPH) and a distance independent speed value 310 (70 MPH). In one embodiment of building the speed trajectory profile 400, step 206 will take the minimum of the various speed values obtained for each distance point or range. Accordingly, in such an embodiment, the speed trajectory profile 400 includes a speed value of 65 MPH (i.e., the distance dependent speed value 304) at the location corresponding to the position of the target vehicle 302, since this speed value is the minimum of the two speed values available at that particular distance in the horizon window 100. Continuing with this example, at the location corresponding to the cluster of traffic 306, the speed value for the speed trajectory profile 400 will be the distance independent speed value 308 (20 MPH cloud-based average traffic speed)

instead of the distance independent speed value 310 (70 MPH speed limit), since the speed value 308 of 20 MPH is a minimum of the available speed values.

Figure 6:
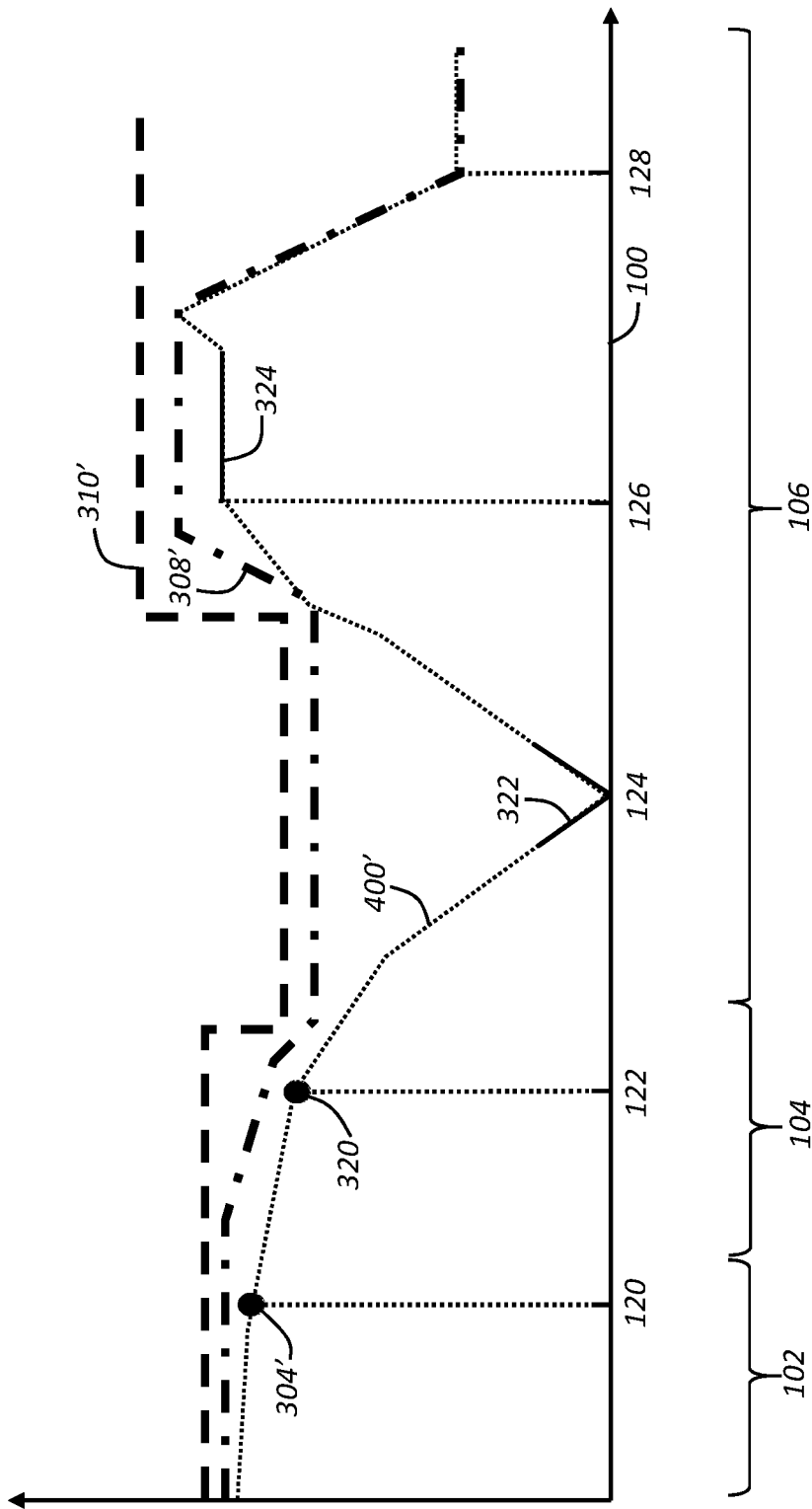
FIG. 6 is another embodiment of a speed trajectory profile.

FIG. 6 shows another embodiment of a speed trajectory profile 400'. This embodiment includes similar speed values to those obtained in the example of FIGS. 3-5, including distance dependent speed value 304' (speed of target vehicle obtained via sensors 30-32), distance independent speed values 308' and 310' (cloud-based average speed and speed limit, respectively, obtained via GPS module 40). Additionally, this embodiment includes a distance dependent speed value 320 for a second target vehicle, which may be received from data gathered from V2X sensor 34. Accordingly, this distance dependent speed value 320 is in the second distance segment 104 corresponding to the reach or range of the V2X sensor 34. Also included in this embodiment of the speed trajectory profile 400' are distance independent speed values 322 and 324, represented by solid lines, which correspond to road feature changes. Information from the GPS module 40 may indicate that road feature changes such as an upcoming turn (distance independent speed value 322) and an upcoming curve (distance independent speed value 324) are likely to impact the speed trajectory profile 400'. Deriving the speed values may involve making assumptions, such as for a turn, that the host vehicle 10 speed will approach or reach 0 MPH, or that given a certain radiused curve, the speed will likely decrease by 5 or 10 MPH. The exact manner in which road features may be addressed may depend on a number of factors, such as the type of road feature, the expected host vehicle maneuver in response to the road feature, information relating to data received from ambient sensor 36 (e.g., on wet pavement, the host vehicle speed through the curve may be less than on dry pavement), etc.

The embodiment of the speed trajectory profile 400' illustrated in FIG. 6, like the embodiments of FIGS. 3-5, takes the minimum speed for each distance to build the speed trajectory profile 400'. However, it is possible to build the speed trajectory profile in other ways besides taking the minimum, such as by weighting or averaging the speeds in some fashion, preferring dynamic speed values (e.g., target vehicle speeds or cloud-based average speeds) over static speed values (e.g., speed limits of the roads), or other implementations. Taking the minimum speed value to build the speed trajectory profile 400, 400' may be easier to process and can further promote efficiency, in some embodiments.

The speed trajectory profiles 400, 400' include a plurality of speed change regions where the speed of the host vehicle 10 is expected to increase or decrease. Accordingly, each speed change region is represented by one or more speed values, such as one of the distance dependent speed values or the distance independent speed values described above. Typically, a speed change region is a range of speed values over time, but it is possible for a speed change region to be a very short range or discrete point. For example, while most speed changes are somewhat gradual, such as when approaching a turn or curve the vehicle will gradually slow and then increase speed, some speed changes, such as those that occur during a vehicle collision, may be more abrupt. Speed change regions may also at least partially overlap, such as when the vehicle approaches a turn, a first speed change region may cover the initial slow down and a second speed change region may start towards the end of the slow down of the first speed change region.

Continuing with the example speed trajectory profile 400 in FIG. 4, a speed change region 110 is represented by the change in speed between the distance dependent speed value 304 and the distance independent speed value 310. In other words, it is expected that the host vehicle 10, currently traveling at 60 MPH, will increase to 65 MPH in 90 meters (i.e., the current position of the target vehicle 302), and thereafter will increase to the speed limit of 70 MPH. Another speed change region 112 is represented by the change in speed between the distance independent speed value 310 (i.e., the speed limit) and the distance independent speed value 308 (i.e., the cloud-based average traffic speed). Accordingly, it is expected that the host vehicle 10, traveling at 70 MPH, will decrease to 20 MPH at 800 m (i.e., the distance ahead of the host vehicle 10 where the cloud-based average traffic speed drops). As illustrated, the length or size of each speed change region 110, 112 may correlate directly with the estimated change of speed (e.g., the smaller speed change region 110 corresponds to a 10 MPH change, whereas the larger speed change region 112 corresponds to a 50 MPH change).

In the example speed trajectory profile 400' in FIG. 6, the speed change regions are defined by the difference in speed resulting from each event 120 (target vehicle data from sensors 30, 32), 122 (vehicle-to-vehicle connection from sensor 34), 124 (turn information obtained from GPS module 40), 126 (curve information obtained from HD map data via a telematics unit or the like), and 128 (drop in cloud-based average traffic speed obtained from GPS module 40 or telematics unit). In some embodiments, the method 200 only processes certain speed change regions. For example, the change in speed may need to be above some threshold (e.g., 5 or 10 MPH). In another example, the speed change regions may only be processed if corroborated by a sufficient source of vehicle information (e.g., if the reported cloud-based average speed is expected to drop, but V2X sensor data indicates that the speed will remain constant, the speed change region may not be processed). Other examples are certainly possible.

Step 208 of the method 200 involves creating a synthesized speed profile 500 by processing the speed trajectory profile 400, 400'. Returning to FIG. 5, the speed trajectory profile 400, which includes speed change regions 110 and 112, is plotted against the processed synthesized speed profile 500. The synthesized speed profile 500 optimizes efficiency of the powertrain control system 12 at each of the plurality of speed change regions 110, 112 represented by the speed values 304, 306 and 310. By modifying expected deceleration rates and acceleration rates to promote coasting, minimize engine RPM, etc., the powertrain control system 12 may be efficiently optimized to reduce emissions, increase fuel economy, and/or promote a more fluid traffic velocity. In some embodiments, as shown in FIG. 5, the synthesized speed profile 500 will be processed such that the recommended distance to increase or decrease to the estimated next likely speed will be longer than what is expected in the speed trajectory profile 400. This processing, as shown, has a tendency to level off the steps in the speed trajectory profile 400, as step 208 may try to match the acceleration or deceleration rate with a desired vehicle acceleration rate or deceleration rate that maximizes efficiency of the powertrain system 12.

In some embodiments, step 208 is accomplished by applying a forward rate limitation filter to limit the acceleration rate at speed change regions where a speed of the host vehicle 10 will be increasing, and applying a backward rate limitation filter to limit a deceleration rate at speed change regions where a speed of the host vehicle 10 will be decreasing. The method 200 may ascertain a desired acceleration rate ($a_{max}$) and/or a desired deceleration rate ($d_{max}$)

which can be used to modify the speed trajectory profile 400 and create the synthesized speed profile 500. Advantageously, the method may take into account the current or expected road grade to determine a desired acceleration rate ($a_{max}$) and/or a desired deceleration rate ($d_{max}$), with the current or expected road grade information being obtained via sensor data from sensors 20-34 or via map information from GPS module 40. In other embodiments, however, the current or expected road grade may not be accounted for, and instead, the desired acceleration rate ($a_{max}$) and/or the deceleration rate ($d_{max}$), may only take into account one or more powertrain characteristics for determining the desired acceleration rate ($a_{max}$) and/or one or more coasting characteristics for determining the desired deceleration rate ($d_{max}$). For example, one or more powertrain characteristics that may impact the desired acceleration rate include propulsion system output or horsepower, availability of boosting (e.g., with a turbocharger or supercharger), and/or the vehicle mass. One or more coasting characteristics that may impact the desired deceleration rate include the powertrain system arrangement, such as whether the transmission is disconnected from the engine or in neutral, the driving mode, and/or the mass of the vehicle. In some embodiments, the desired acceleration rate ($a_{max}$) or the desired deceleration rate ($d_{max}$) may be a standard known value, a modified known value, or a calibratable known value (e.g., a value between 0.5-3 m/s² for $a_{max}$ and/or 0.5-5 m/s² for $d_{max}$).

Figure 7:
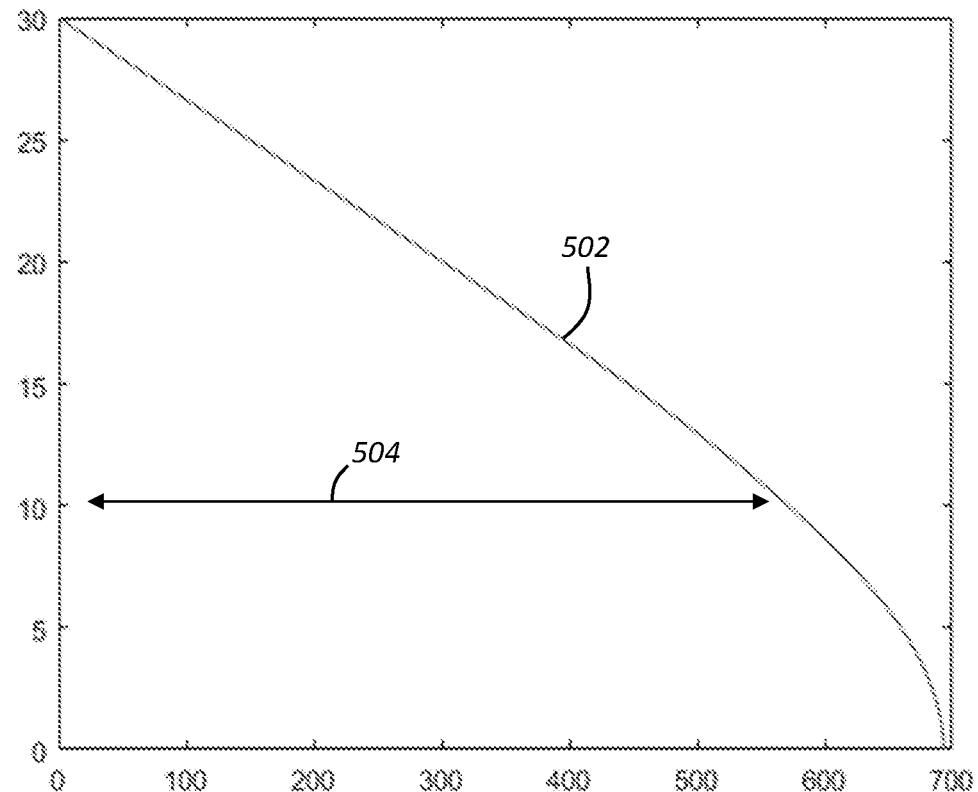
FIG. 7 is a graph of vehicle coasting speed versus distance that may be used to process the speed trajectory profile of FIGS. 4 and 5.

FIG. 7 illustrates one example of how the speed change region 112 of FIGS. 3-5 is processed to form the synthesized speed profile 500 from the speed trajectory profile 400. FIG. 7 is a plot or curve 502 of distance (x-axis) vs vehicle coasting speed (y-axis). The shape of this curve 502 will vary from vehicle to vehicle, and may even be updated with real-time information, such as with sensor data from sensors 20-34 or the GPS module 40 or another vehicle system or module. In essence, the curve or plot 502 attempts to match the deceleration rate with the characteristics of the host vehicle 10 and characteristics of the road in the horizon window 100 to create the desired deceleration rate ($d_{max}$). Factors that may impact the shape or slope of plot 502 include changes in road grade (which may be determined with the sensor data from sensors 20-34 or the GPS module 40 or another vehicle system or module), the mass of the host vehicle 10, and the powertrain control system 12 configuration (e.g., engine size, type of propulsion and braking, etc.). In some embodiments, the plot 502 is known and unmodified during execution of method 200, such as when the mass of the host vehicle 10 and the powertrain control system 12 configuration are used to develop the plot. Or, in some embodiments, the plot 502 is updated during execution of method 200, such as when road grade data or information is used to develop the plot. The plot 502 illustrates that it can take about 500 m to coast from 70 MPH to 20 MPH, as designated by the double arrow 504. The distance 504 extrapolated from the speed change region 112 can then be used to suggest a different distance to start decelerating in the synthesized speed profile 500. A similar chart or plot may be used to match the acceleration rate with the characteristics of the host vehicle 10 and characteristics of the road in the horizon window 100 to create a desired acceleration rate ($a_{max}$) for the speed change region 110.

Figure 8:
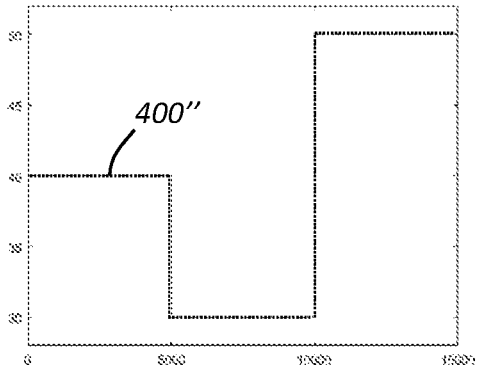
FIG. 8 is an unprocessed speed trajectory profile.
Figure 9:
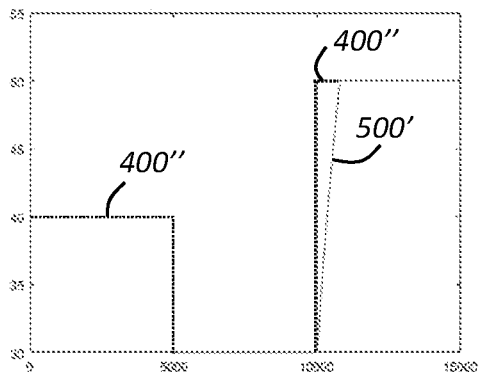
FIG. 9 is the speed trajectory profile of FIG. 8 after it is forward filtered to form the synthesized speed profile.
Figure 10:
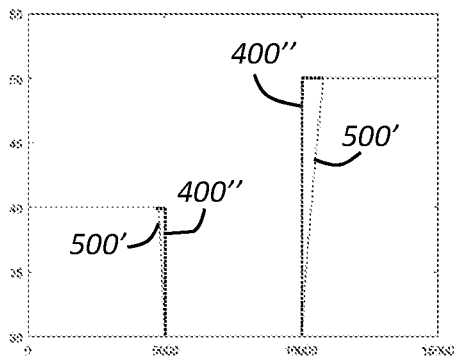
FIG. 10 is the speed trajectory profile of FIG. 8 after it is double-filtered to form the synthesized speed profile.

FIGS. 8-10 illustrate another embodiment of applying a forward rate limitation filter to limit the acceleration rate at speed change regions where a speed of the host vehicle 10 will be increasing, and applying a backward rate limitation filter to limit a deceleration rate at speed change regions where a speed of the host vehicle 10 will be decreasing. In this simplified example, the speed trajectory profile 400" includes two speed change regions at 5000 m and 10000 m, respectively. As shown in FIG. 8, at 5000 m, the speed of host vehicle 10 is expected to decrease from 40 m/s to 30 m/s and at 10000 m, the speed of host vehicle 10 is expected to increase from 30 m/s to 50 m/s. FIG. 9 shows the application of a forward rate limitation filter to limit the acceleration rate, and FIG. 10 shows the application of a backward rate limitation filter to limit the deceleration rate. Accordingly, FIG. 8 shows an unfiltered profile, FIG. 9 shows a forward-filtered profile, and FIG. 10 shows a double-filtered profile. As shown, the step change of the synthesized speed profile 500' is more gradual than the step change of the speed trajectory profile 400" at each of the speed change regions. One example forward rate limitation filtering algorithm involves processing the speed trajectory profile 400" from the front to the end to enforce $dv/dx < a_{max}/v$. In essence, if $dv/dt$ is greater than 0, then $dv/dt$ is less than $a_{max}$, and since $dv/dt = (dv/dx)v$, then $dv/dx < a_{max}/v$. Similarly, one example backward rate limitation filtering algorithm involves processing the speed trajectory profile 400" from the end to the front to enforce $dv/dt > -d_{max}/v$. In essence, if $dv/dt$ is less than zero, then $dv/dt$ is greater than $-d_{max}$, and since $dv/dt = (dv/dx)v$, then $dv/dt > -d_{max}/v$. This operational scheme can smooth trajectory bumps to avoid unnecessary powertrain mode transitions. Further, using separate operations to process the speed trajectory profile 400, 400', 400" from the front to the end and separately from the end to the front is desirable, and can result in a more accurate and robust synthesized speed profile 500, 500'.

The synthesized speed profile 500, 500' may be used in a variety of ways by the host vehicle 10, and the way in which it is used is typically dependent on the underlying structure of the propulsion system (e.g., internal combustion engine controlled by the driver, hybrid or electric autonomous vehicle, etc.). As described above, in some embodiments, the control module 80 may be used to control the vehicle powertrain or perform an automated driving action. In such embodiments, the synthesized speed profile 500, 500' may be used to adjust the fuel amount, injection timing, residual exhaust gas or EGR, and/or turbo boost to control the amount of torque at each speed change region. In other embodiments, the powertrain may also include an electric motor that provides torque in accordance with a torque command. The torque of electric motor can be combined with the torque of the engine to provide power for the powertrain control system 12, such as in a hybrid vehicle. The present method may also be used in the context of an electric vehicle that has no engine at all. In such embodiments, the synthesized speed profile 500, 500' may be used to optimize recovered energy via a regenerative braking system controlled by brake module 70, to cite one example. The synthesized speed profile 500, 500' may be particularly useful in semi-autonomous or autonomous driving modes, and may be used to develop or modify a control signal to be used by the control module 80 and/or the engine control module 60. In standard, driver-controlled modes, the synthesized speed profile 500, 500' may be directly or indirectly presented to the driver via HMI 50. For example, the synthesized speed profile 500, 500' could be used to provide speed recommendations to the driver, or may let the driver know that it would be more efficient for the powertrain control system 12 if coasting was to begin at a certain distance in the horizon window 100. If there is a slowdown ahead but the driver manually keeps increasing the speed of the host vehicle 10, the method 200 may provide the difference between the actual speed and the synthesized speed trajectory as the host vehicle travels. Again, these examples and the outputs of the method 200 will vary depending on factors such as the vehicle propulsion system, the driving mode, as well as other characteristics.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

What is claimed is:

1. A method for operating a powertrain control system of a host vehicle, the method comprising the steps of:
    receiving data measured from a plurality of sensors, wherein the measured data relates to distance dependent speed values;
    receiving information from one or more vehicle modules, wherein the vehicle module information relates to distance independent speed values;
    building a speed trajectory profile for a horizon window, wherein the speed trajectory profile includes a plurality of speed change regions, wherein each speed change region of the speed trajectory profile includes a minimum of at least one or more available distance dependent speed values and at least one or more available distance independent speed values, such that when there is a plurality of speed values available for a given distance in the horizon window, a minimum of the plurality of speed values available is used for the speed trajectory profile; and
    creating a synthesized speed profile for the horizon window by processing the speed trajectory profile, wherein the synthesized speed profile optimizes efficiency of the powertrain control system at each of the plurality of speed change regions.

2. The method of claim 1, wherein the horizon window includes a plurality of distance segments.

3. The method of claim 2, wherein the distance independent speed values are available in areas of the speed trajectory profile throughout the entire horizon window in each of the distance segments.

4. The method of claim 2, wherein the distance dependent speed values are available in areas of the speed trajectory profile in one or more distance segments at a portion of the horizon window closest to the host vehicle.

5. The method of claim 4, wherein for one or more distance segments at a portion of the horizon window farthest from the host vehicle, the speed trajectory profile only includes speed change regions corresponding to distance independent speed values without any speed change regions corresponding to distance dependent speed values.

6. The method of claim 5, wherein the portion of the horizon window closest to the host vehicle includes two distance segments, and the portion of the horizon window farthest from the host vehicle includes a third distance segment, wherein a distance of the portion of the horizon window closest to the host vehicle corresponds to a range of one or more sensors of the plurality of sensors.

7. The method of claim 6, wherein the first distance segment is from about 0 meters to 50-100 meters ahead of the host vehicle, the second distance segment is from about 50-100 meters to 150-250 meters ahead of the host vehicle, and the third distance segment is from about 150-250 meters to about 800-1200 meters ahead of the host vehicle.

8. The method of claim 6, wherein the step of building the speed trajectory profile includes favoring distance dependent speed values over distance independent speed values in the first distance segment and the second distance segment.

9. The method of claim 6, wherein the step of building the speed trajectory profile includes favoring distance independent speed values over distance dependent speed values in the third distance segment.

10. The method of claim 1, further comprising the step of adjusting the speed trajectory profile as the horizon window shifts.

11. The method of claim 10, wherein the step of adjusting the speed trajectory profile includes corroborating at least some speed change regions that correspond to at least some distance independent speed values with distance dependent speed values as the horizon window shifts.

12. The method of claim 1, wherein the step of processing the speed trajectory profile includes applying a forward rate limitation filter to limit an acceleration rate at speed change regions where a speed of the host vehicle will be increasing.

13. The method of claim 12, wherein the forward rate limitation filter uses a current or expected road grade and one or more powertrain characteristics of the host vehicle to limit the acceleration rate.

14. The method of claim 1, wherein the step of processing the speed trajectory profile includes applying a backward rate limitation filter to limit a deceleration rate at speed change regions where a speed of the host vehicle will be decreasing.

15. The method of claim 14, wherein the backward rate limitation filter uses a current or expected road grade and one or more coasting characteristics of the host vehicle to limit the deceleration rate.

16. The method of claim 1, wherein the speed change regions of the speed trajectory profile correspond to locations of target vehicles or locations of road feature changes.

17. A method for operating a powertrain control system of a host vehicle, the method comprising the steps of:
    receiving speed values from data measured from one or more sensors or information obtained from one or more vehicle modules, wherein the speed values represent speeds of one or more target vehicles or speeds at one or more road feature changes ahead of the host vehicle in a horizon window;
    building a speed trajectory profile for the horizon window, wherein the speed trajectory profile includes a plurality of speed change regions that correspond to locations of the one or more target vehicles or locations of the one or more road feature changes;

applying a forward rate limitation filter to limit an acceleration rate at speed change regions in the speed trajectory profile where a speed of the host vehicle will be increasing, wherein the forward rate limitation filter processes the speed trajectory profile from a front of the speed trajectory profile to an end of the speed trajectory profile;

applying a backward rate limitation filter to limit a deceleration rate at speed change regions where a speed of the host vehicle will be decreasing, wherein the backward rate limitation filter processes the speed trajectory profile from the end of the speed trajectory profile to the front of the speed trajectory profile; and using the limited acceleration rate and the limited deceleration rate to control the powertrain control system at each of the speed change regions in the speed trajectory profile.

18. A powertrain control system for a host vehicle, comprising:
- a plurality of sensors configured to measure data relating to distance dependent speed values;
- one or more vehicle modules configured to provide information relating to distance independent speed values;
- a speed trajectory building tool configured to build a speed trajectory profile for a horizon window, wherein the speed trajectory profile includes a plurality of speed change regions, wherein each speed change region of the speed trajectory profile includes a minimum of at least one or more available distance dependent speed values and at least one or more available distance independent speed values, such that when there is a plurality of speed values available for a given distance in the horizon window, a minimum of the plurality of speed values available is used for the speed trajectory profile; and
- a speed trajectory processing tool configured to create a synthesized speed profile for the horizon window by processing the speed trajectory profile to optimize efficiency of the powertrain control system at each of the plurality of speed change regions.

19. The system of claim 18, wherein the speed trajectory building tool and the speed trajectory processing tool are software platforms configured to be executed using one or more electronic processors associated with a control module of the host vehicle.

* * * * *